United States Patent [19]

Daloz

[11] Patent Number: 4,694,740
[45] Date of Patent: Sep. 22, 1987

[54] DOMESTIC APPLIANCE USING A HYDROPHILIC POWDER

[75] Inventor: Joanny Daloz, Is Sur Tille, France
[73] Assignee: SEB S.A., Selongey, France
[21] Appl. No.: 844,782
[22] Filed: Mar. 27, 1986
[30] Foreign Application Priority Data Apr. 3, 1985 [FR] France ............................. 85 05084

[51] Int. Cl.⁴ .......................... A23F 3/00; A47J 31/00
[52] U.S. Cl. ............................. 99/323.3; 99/289 R; 366/146; 366/154; 366/165; 406/32; 406/109
[58] Field of Search ............... 99/287, 289 R, 232.3, 99/279, 348, 275; 366/102, 103, 104, 106, 107, 165, 150, 146, 144, 139, 349, 348, 154; 222/636; 406/109, 130, 32

[56] References Cited

U.S. PATENT DOCUMENTS

| | | |
|---|---|---|
| 2,812,879 | 11/1957 | Arnett . |
| 3,385,569 | 5/1968 | Bookout ............................. 366/165 |
| 3,446,399 | 5/1969 | Ross et al. . |
| 3,682,090 | 8/1972 | Meriggi ................................ 99/289 |
| 4,357,861 | 11/1982 | Girolamo ......................... 99/289 R |
| 4,493,249 | 1/1985 | Stover ................................ 366/165 |

FOREIGN PATENT DOCUMENTS

| | | |
|---|---|---|
| 1212045 | 9/1966 | Fed. Rep. of Germany . |
| 1952061 | 7/1970 | Fed. Rep. of Germany . |
| 2734992 | 2/1978 | Fed. Rep. of Germany . |
| 658046 | 5/1929 | France . |
| 2298997 | 8/1976 | France . |
| 2323361 | 4/1977 | France . |

Primary Examiner—Robert W. Jenkins
Attorney, Agent, or Firm—Young & Thompson

[57] ABSTRACT

The domestic appliance using a hydrophilic powder comprises a chamber (4) for dispensing the powder and means for transferring the powder to a container (20).

Said means comprise a turbine (7) to form a current of air sufficient to propel all the powder from the dispensing chamber (4) to the container (20).

Use more particularly for constructing a domestic appliance adapted to prepare a drink from a soluble powder such as coffee and a liquid.

10 Claims, 7 Drawing Figures

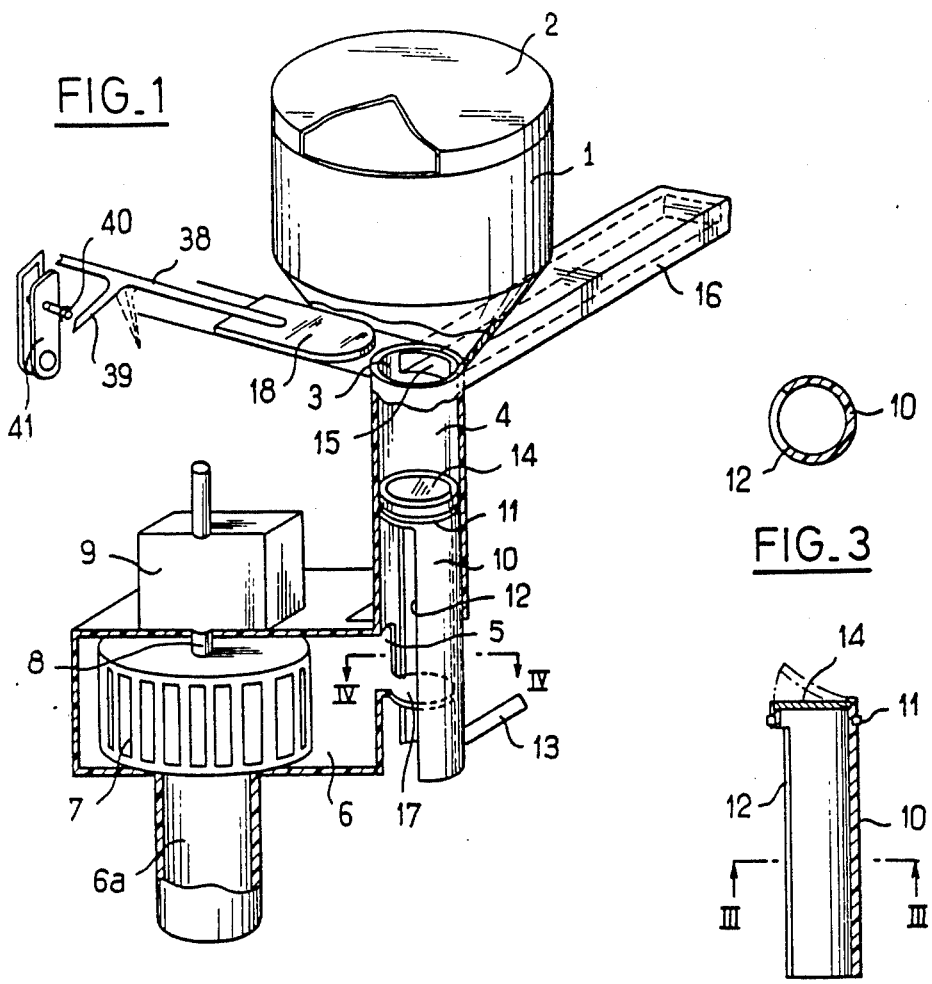
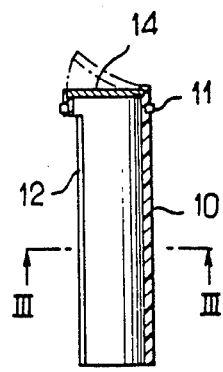
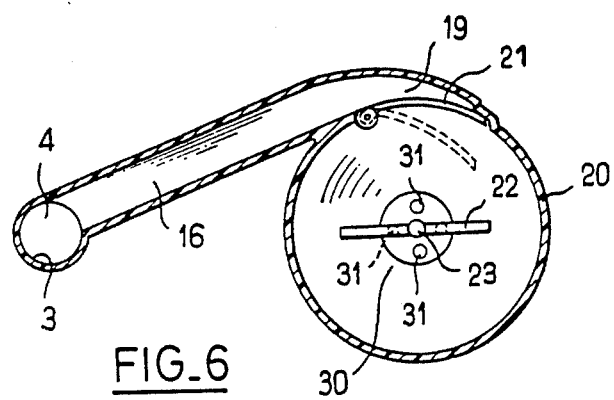
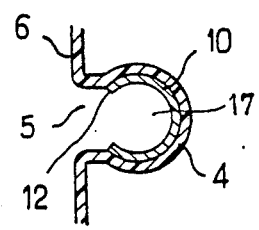
FIG.1  FIG.2  FIG.3  FIG.4  FIG.6

DOMESTIC APPLIANCE USING A HYDROPHILIC POWDER

This invention relates to a domestic appliance using a hydrophilic powder, comprising a chamber for dispensing said powder and means for transferring said powder to a container.

The invention relates more particularly to a domestic appliance for preparing hot or cold drinks based on a soluble powder such as coffee, chocolate, milk, in powder form, etc.

Appliances are known which are intended not for domestic use but for public use and are generally fixed. They enable drinks to be prepared by coin actuated mechanisms. Appliances of this kind are decribed, for example, in French patents 2 323 361 and 2 365 995.

In these appliances, the transfer of powder from a powder reserve to a powder dispensing chamber is done by gravity. Similarly, the transfer of the powder from the dispensing chamber to a chamber for mixing the powder with water, milk or some other liquid, is by gravity.

The transfer of powder by gravity means that the various chambers have to be disposed one above the other, thus necessitating an appreciable height, so that these appliances are scarcely compatible with domestic use.

Also, in this type of appliance using a soluble or at least hydrophilic powder, the liquid vapour forming during heating of the liquid tends to rise towards the powder dispensing chamber and towards the powder reservoir, thus causing the powder to cake and having an adverse effect on the operation of the appliance.

To obviate this difficulty, complex and expensive means have to be used to provide a seal between the various compartments of the appliance once the powder transfer has taken place. Consequently these appliances are very expensive in construction, so that they are finally incompatible with domestic use.

The object of this invention is to provide a domestic appliance using a hydrophilic powder, which occupies little space and is of simple construction, while obviating any risk of the hydrophilic powder caking due to the vapour formed in the appliance.

According to the invention, the domestic appliance using a hydrophilic powder, comprising a powder dispensing chamber and means for transferring said powder to a mixing container, is characterised in that said means comprise means to form an instantaneous current of air having a rate of flow and pressure sufficient to propel all the powder from the dispensing chamber to the mixing container.

Propelling the powder by means of a current of air obviates the disadvantage of the superposed arrangement of the different compartments of the appliance, so that the resulting appliance is less bulky.

Also, propelling the powder by means of a current of air is a simple way of obviating the problem of the powder caking due to the vapour forming in the appliance.

Consequently, the appliance according to the invention is very suitable for the production of a domestic appliance for preparing a drink from a soluble powder and a liquid, comprising a chamber for dispensing said powder in a quantity according to the volume of drink required to be prepared, said chamber communicating with a chamber for mixing said powder with the liquid.

According to one advantageous version of the invention, said mixing chamber is disposed next to the dispensing chamber and said chambers communicate with one another via a duct connecting the top parts of said chambers, while in addition the appliance comprises a turbine driven by a motor to create a current of air between the base of the dispensing chamber and the opening leading into the duct, the base of said chamber having means to prevent the passage of powder while being permeable to the current of air.

The side-by-side arrangement of the dispensing and mixing chambers reduces the height of the appliance. The current of air produced by the turbine blows the powder contained in the dispensing chamber towards the mixing chamber. This current of air keeps the powder in the pulverulent state and avoids any risk of its caking or adhering to the walls of the dispensing chamber and of the duct connecting the latter to the mixing chamber.

According to a preferred version of the invention, the dispensing chamber is substantially cylindrical and has a substantially vertical axis, a piston being mounted for sliding inside said cylindrical chamber in order to modify its volume.

This piston enables the quantity of powder to be dispensed very conveniently in accordance with the volume or concentration required for the drink. Also, the cylindrical shape of this chamber and the fact that the air current inlet and outlet are disposed respectively at the base and at the top part of this chamber are favourable to good conditions for the discharge of the powder in response to the current of air.

According to another advantageous feature of the invention, the transfer duct leads into the mixing chamber via a valve permeable to the current of air and to the powder originating from the dispensing chamber but impermeable in the opposite direction.

This valve finally prevents any possibility of vapour rising to the duct and dispensing chamber with the possible risk of moistening the hydrophilic powder and causing it to cake.

Other features and advantages of the invention will be apparent from the following description.

In the accompanying drawings, which are given by way of example without limiting force, FIG. 1 is a diagrammatic perspective of an appliance according to the invention with some parts shown broken away.

FIG. 2 is a longitudinal section of the appliance piston.

FIG. 3 is a section on the line III—III in FIG. 2.

FIG. 4 is a section on the line IV—IV in FIG. 1.

FIG. 6 is a section on the broken line VI—VI in FIG. 5.

Figure 7:
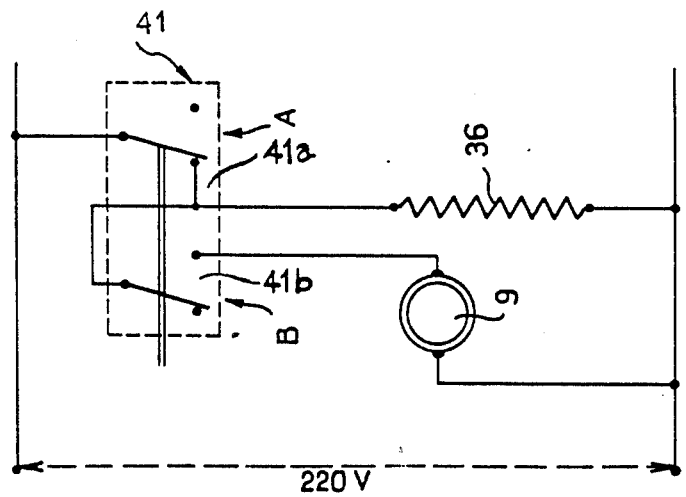
FIG. 7 is the diagram of the electrical control circuit for the various electrical components of the appliance.

In the embodiment shown in FIG. 1, the appliance according to the invention adapted to prepare a hot drink from a soluble powder such as coffee comprises a funnel 1 containing the soluble powder and closed by a lid 2, the bottom part of the funnel having an aperture 3 leading into a cylindrical vertical-axis dispensing chamber 4.

The bottom part of the cylinder making up the dispensing chamber 4 has a lateral opening 5 communicating with a compartment 6 in which a turbine 7 is mounted for rotation, its vertical shaft 8 being driven by an electric motor 9. Turbine 7 draws in external air via the duct 6a.

A piston 10 is mounted slidably in the cylindrical dispensing chamber 4 and its head bears an annular gasket 11. Piston 10 has a lateral recess 12 extending over practically its entire height, so that aperture 5 can communicate with the interior of the piston 10 in every position thereof inside the dispensing chamber 4. Movement of the piston 10 is controlled by lever 13 accessible to the user, so that the latter can adjust the inside volume of the dispensing chamber 4.

The head of the piston 10 forms the base of the dispensing chamber 4, whose position determines the volume of powder introduced into said chamber. The head of the piston 10 bears a valve 14 in the form of a disc of elastic material resting elastically on an aperture formed in said head and fixed to the latter by a flexible joint so that the valve 14 can lift in response to a pressure exerted inside the piston (see FIG. 2). Valve 14 prevents powder from passing to the interior of the piston while allowing the current of air to pass when blown by the turbine 7 to the interior of the piston 10.

Just below the aperture 3 by which the funnel 1 communicates with the inside of the dispensing chamber 4 there is a lateral opening 15 communicating with a substantially horizontal duct 16. This duct 16 leads into a mixing chamber which will be described hereinafter.

Aperture 3 can be closed by a sliding damper 18 which can be operated by the user.

Also, as shown in FIGS. 1 and 4, the bottom part of the hollow piston 10 is sealed from the air inlet aperture 5 by a disc 17 matching the internal contour of the piston 10. Disc 17 is fixed to compartment 6 containing the turbine 7, beneath the air inlet aperture 5.

Figure 5:
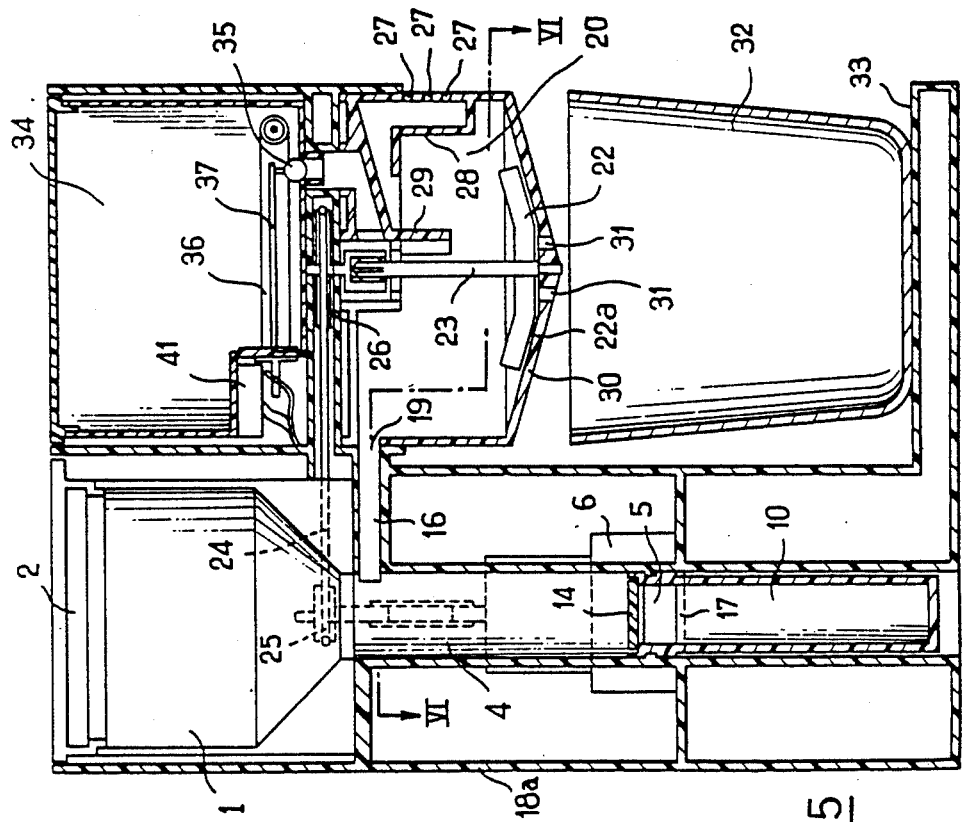
FIG. 5 is a longitudinal section of an appliance according to the invention for preparing coffee from a soluble coffee powder.

In the embodiment shown in FIG. 5, the assembly shown in FIG. 1 is mounted inside an outer casing 18a.

As will be seen from FIG. 5, the horizontal duct 16 connected to the top part of the dispensing chamber 4 leads via an aperture 19 into a mixing chamber 20 which is therefore situated next to the dispensing chamber 4.

Aperture 19 is closed by a valve 21 (see FIG. 6) which is permeable to the current of air and to the powder propelled by the latter from the dispensing chamber 4. Valve 21 is, however, impermeable in the opposite direction.

The mixing chamber 20 comprises a blade 22 mounted to rotate on a vertical shaft 23. Blade 22 is rotated by motor 9 which drives turbine 7 by means of a transmission belt 24 trained over pulleys 25, 26.

The mixing chamber 20 has small apertures 27 for air discharge on its side wall remote from the valve 21. Opposite these apertures are two baffles 28, 29 so devised as to prevent the powder and liquid introduced into the chamber 20 from being discharged through the apertures 27.

The base 30 of the mixing chamber 20 is conical and has a series of holes 31 around the shaft 23 of the blade 22 for the discharge of the drink prepared in the chamber 20. Beneath these holes there is disposed a container 32 to collect the drink, the container being disposed on a base 33 forming part of the casing 18a. It will also be seen from FIG. 5 that the bottom edge 22a of the rotary blade 22 is flush with the conical base 30 of the chamber 20. As it rotates, blade 22 produces a negative pressure inside chamber 20 to prevent the drink from flowing off via the holes 31.

Above the mixing chamber 20 and next to the funnel 1 there is disposed a liquid reservoir 34 whose base communicates with the interior of the chamber 20 via a valve 35. A heating resistance 36 extends next to this base.

Opening of the valve 35 is controlled by a bimetallic element 37 or the like so adjusted that the valve 35 opens when the temperature of the liquid contained in the reservoir 34 reaches the required value, e.g. 85°-90° C. in the case of coffee, It will also be apparent from FIG. 1 that the damper 18 controlling the opening and closing of the opening 3 is connected to a rod 38 which can be acutated manually by the user. Rod 38 has a stop 39 which can abut the control knob 40 of a temperature limiter 41 so that the latter is reset when the user puts the damper 18 into the open position. This temperature limiter 41 is disposed in contact with the heating reservoir 34 (see FIG. 5).

The temperature limiter 41 comprises two electrical circuits A and B (see FIG. 7) reacting to different temperatures.

When the temperature limiter 41 is set cold, the movable armature 41 associated with the heating resistance 36 closes the circuit A so that voltage is applied to resistance 36.

The movable armature 41 associated with the electric motor 9, on the other hand, is in the open position so that this motor does not receive current.

When the temperature of the liquid in the heating reservoir 34 reaches the required value, e.g. 85° C. in the case of coffee, the movable armature 41 of the electrical circuit B comes into the closure position, thus controlling the electrical supply to the motor 9.

The electrical resistance 36 continues to heat until the temperature of the liquid reaches a temperature of 95° C. for example. The movable armature 41a of the circuit A then rocks and cuts the electrical supply to the heating resistance 36 and to the motor 9.

Operation of the domestic appliance described above is as follows:

The funnel 1 is filled with soluble coffee powder and a quantity of water corresponding to the required number of cups is poured into the heating reservoir 34.

The dispensing piston 10 is adjusted so that the volume of the dispensing chamber 4 corresponds to the volume of coffee required for the said number of cups.

Damper 18 is opened and then closed, causing limiter 41 to be set in its open position. The resistance 36 starts to heat the water contained in the reservoir 34 and the coffee powder completey fills the dispensing chamber 4, i.e. the volume of the chamber 4 contained between the damper 18 and the valve 14.

When the water reaches 85° C., the motor 9 starts and causes the mixer blade 22 to rotate while rotation of the turbine 7 produces a current of air which enters the piston interior and lifts its valve 14. This air current drives the coffee powder contained in the dispensing chamber 4 towards the duct 16 and the mixing chamber 20, actuating the valve 21 as it passes.

At a temperature between 85° and 90° C., the deformable strip 37 lifts the valve 35, so that the hot water contained in the reservoir 34 passes into the mixing chamber 20.

Because of the rotation of the blade 22, a centrifugal effect occurs and draws air through the ports 31 and thus prevents the powder or drink from flowing out of the mixing chamber 20.

Motor 9 stops, as does heating of the water, at a temperature of substantially 95° C. Blade 22 having stopped, the drink can then flow into the container 32. When the ventilating effect stops, the valve 21 closes as does also the valve 14. No water vapour can then rise towards the funnel 1, the dispensing chamber 4 and the communicating duct 16, thus obviating any risk of water condensation likely to cause the powder to cake.

Of course the invention is not limited to the above-described example and it may be modified in various ways without departing from the scope of the invention.

For example, the invention can be applied to any domestic appliance using a hydrophilic powder required to be transferred between a dispensing chamber and a container in which there is any risk of clogging of the powder in the presence of condensed water or vapour.

I claim:

1. A domestic appliance for preparing a drink from a soluble powder and a liquid, comprising a chamber (4) for dispensing said powder in a quantity according to the volume of drink required to be prepared, a chamber (20) for mixing said powder with the liquid, said chambers communicating with one another via a duct (16) connecting the top parts of said chambers, a turbine (7) driven by a motor (9) to create a current of air between the base of the dispensing chamber (4) and an opening (15) leading into said duct (16), the base of said chamber having means (14) to prevent the passage of powder while being permeable to the current of air.

2. An appliance according to claim 1, the dispensing chamber (4) being substantially cylindrical and having a substantially vertical axis, a piston (10) being mounted slidably inside said chamber to be able to modify the volume thereof, characterized in that the head of the piston (10) forms the base of the dispensing chamber (4) and bears a valve (14) permeable to the passage of the current of air and impermeable to the powder.

3. An appliance according to claim 2, characterised in that the dispensing chamber (4) has at its bottom part an air inlet aperture (5) communicating with the air outlet of the turbine (7).

4. An appliance according to claim 2, characterised in that the piston (10) mounted in said chamber is hollow and allows free passage of the air from the turbine outlet to the dispensing chamber.

5. An appliance according to claim 4, characterised in that the piston has a lateral recess (12) communicating with the air inlet aperture (5), means (17) being provided to seal off the bottom part of the piston (10) with respect to the air inlet aperture (5).

6. An appliance according to claim 5, characterised in that said means comprise a disc (17) matching the inner contour of the piston (10), said disc being fixed to the turbine compartment (6) beneath the air inlet aperture (5).

7. An appliance according to claim 2, characterised in that the transfer duct (16) leads into the mixing chamber (20) via a valve (21) permeable to the current of air and to the powder originating from the dispensing chamber (4) but impermeable in the opposite direction.

8. An appliance according to claim 7, the mixing chamber (20) comprising a lateral air discharge aperture (27), characterised in that the aperture (27) is disposed remote from the valve (21), one or more baffles (28, 29) being provided facing said aperture (27) to prevent the passage of the powder and liquid introduced into said chamber.

9. An appliance according to claim 7, characterised in that the base (30) of the mixing chamber (20) comprises at least one hole (31) for the discharge of the liquid-powder mixture and in that a rotary blade (22) mounted for rotation in said chamber has a bottom edge (22a) which is flush with the chamber base (30).

10. An appliance according to claim 2, a funnel (1) for supplying powder to the dispensing chamber (4) being disposed above the latter and leading into said chamber via an aperture (3) which can be closed by a closure member (18) accessible to the user, said aperture (3) being disposed just above the aperture (15) which communicates with the powder transfer duct (16), characterised in that the closure member (18) for the comunication between the funnel (1) and the dispensing chamber (4) comprises means (39) which, when the closure member is opened, are adapted to actuate a temperature limiter (41) which controls the starting of the heating of the resistance (36), means also being provided to control the starting of the motor driving the turbine (7) and the rotary blade (22) when the temperature of the liquid contained in the reservoir (34) reaches a predetermined value.

* * * * *